United States Patent
Henry et al.

(10) Patent No.: US 10,257,532 B2
(45) Date of Patent: *Apr. 9, 2019

(54) METHOD OF CODING AND DECODING IMAGES, CODING AND DECODING DEVICE AND COMPUTER PROGRAMS CORRESPONDING THERETO

(71) Applicant: DOLBY INTERNATIONAL AB, Amsterdam Zuidoost (NE)

(72) Inventors: Felix Henry, Saint Gregoire (FR); Gordon Clare, Pace (FR)

(73) Assignee: Dolby International AB, Amsterdam Zuidoost (NL)

( * ) Notice: Subject to any disclaimer, the term of this patent is extended or adjusted under 35 U.S.C. 154(b) by 0 days.

This patent is subject to a terminal disclaimer.

(21) Appl. No.: 15/619,093

(22) Filed: Jun. 9, 2017

(65) Prior Publication Data

US 2017/0280149 A1 Sep. 28, 2017

Related U.S. Application Data

(63) Continuation of application No. 15/132,081, filed on Apr. 18, 2016, now Pat. No. 9,706,219, which is a
(Continued)

(30) Foreign Application Priority Data

Nov. 7, 2011 (FR) ...................... 11 60114

(51) Int. Cl.
*H04N 19/50* (2014.01)
*H04N 19/176* (2014.01)
(Continued)

(52) U.S. Cl.
CPC .......... *H04N 19/50* (2014.11); *H04N 19/117* (2014.11); *H04N 19/147* (2014.11);
(Continued)

(58) Field of Classification Search
None
See application file for complete search history.

(56) References Cited

U.S. PATENT DOCUMENTS 7,379,608 B2  5/2008  Marpe et al.
8,315,310 B2  11/2012  Shi
(Continued)

FOREIGN PATENT DOCUMENTS

CN   1878311    12/2006
CN   101044762   9/2007
(Continued)

OTHER PUBLICATIONS

Hadar O, et al. "Rate distortion optimization for efficient watermarking in the DCT domain," 2008 IEEE International Symposium on Broadband Multimedia Systems and Broadcasting, Piscataway, NJ, USA, Mar. 31, 2008 pp. 1-8.*
(Continued)

*Primary Examiner* — Michael J Hess

(57) ABSTRACT

A method is provided for coding at least one image split up into partitions, a current partition to be coded containing data, at least one data item of which is allotted a sign. The coding method includes, for the current partition, the following steps: calculating the value of a function representative of the data of the current partition with the exclusion of the sign; comparing the calculated value with a predetermined value of the sign; as a function of the result of the comparison, modifying or not modifying at least one of the data items of the current partition, in the case of modification, coding the at least one modified data item.

1 Claim, 6 Drawing Sheets

Related U.S. Application Data continuation of application No. 14/492,950, filed on Sep. 22, 2014, now Pat. No. 9,319,697, which is a continuation of application No. 14/356,804, filed as application No. PCT/FR2012/052551 on Nov. 6, 2012, now Pat. No. 9,609,344.

(51) Int. Cl.

| | | |
|---|---|---|
| H04N 19/147 | (2014.01) | |
| H04N 19/46 | (2014.01) | |
| H04N 19/463 | (2014.01) | |
| H04N 19/467 | (2014.01) | |
| H04N 19/196 | (2014.01) | |
| H04N 19/91 | (2014.01) | |
| H04N 19/167 | (2014.01) | |
| H04N 19/85 | (2014.01) | |
| H04N 19/117 | (2014.01) | |
| H04N 19/18 | (2014.01) | |
| H04N 19/48 | (2014.01) | |
| H04N 19/13 | (2014.01) | |

(52) U.S. Cl.
CPC ......... *H04N 19/167* (2014.11); *H04N 19/176* (2014.11); *H04N 19/18* (2014.11); *H04N 19/197* (2014.11); *H04N 19/46* (2014.11); *H04N 19/463* (2014.11); *H04N 19/467* (2014.11); *H04N 19/48* (2014.11); *H04N 19/85* (2014.11); *H04N 19/91* (2014.11); *H04N 19/13* (2014.11)

(56) References Cited

U.S. PATENT DOCUMENTS

| | | | |
|---|---|---|---|
| 8,767,824 B2 | 7/2014 | Misra et al. | |
| 8,804,826 B2 | 8/2014 | Zan | |
| 9,001,888 B2 | 4/2015 | Henry et al. | |
| 9,008,184 B2 | 4/2015 | Wang | |
| 9,363,512 B2 | 6/2016 | Campbell | |
| 9,374,599 B2 | 6/2016 | Henry | |
| 2004/0228404 A1 | 11/2004 | Yu | |
| 2005/0123207 A1 | 6/2005 | Marpe et al. | |
| 2007/0080832 A1 | 4/2007 | Yang et al. | |
| 2007/0253479 A1 | 11/2007 | Mukherjee | |
| 2008/0246637 A1 | 10/2008 | Chen et al. | |
| 2009/0003446 A1 | 1/2009 | Wu et al. | |
| 2009/0196517 A1 | 8/2009 | Divorra | |
| 2009/0232204 A1 | 9/2009 | Lee | |
| 2010/0014584 A1 | 1/2010 | Feder et al. | |
| 2010/0135416 A1 | 6/2010 | Huang et al. | |
| 2012/0106647 A1 | 5/2012 | Jung | |
| 2012/0224631 A1 | 9/2012 | Jung | |
| 2012/0230417 A1 | 9/2012 | Sole Rojals et al. | |
| 2012/0230418 A1 | 9/2012 | Sole Rojals et al. | |
| 2013/0188725 A1* | 7/2013 | Wang ................... H04N 19/176 375/240.18 | |
| 2013/0336409 A1* | 12/2013 | He ..................... H04N 19/463 375/240.25 | |
| 2014/0233655 A1 | 8/2014 | Jung | |
| 2014/0301462 A1 | 10/2014 | Gu | |
| 2014/0314144 A1 | 10/2014 | Henry et al. | |
| 2014/0348223 A1 | 11/2014 | Henry et al. | |
| 2014/0348237 A1 | 11/2014 | Thiesse | |
| 2015/0010076 A1 | 1/2015 | Henry et al. | |
| 2015/0010089 A1 | 1/2015 | Henry et al. | |
| 2015/0195568 A1 | 7/2015 | Henry et al. | |

FOREIGN PATENT DOCUMENTS

| | | |
|---|---|---|
| CN | 101194427 | 6/2008 |
| CN | 101944362 | 1/2011 |
| EP | 2618572 | 7/2013 |
| FR | 2920929 | 3/2009 |
| GB | 2360915 | 10/2001 |
| HK | 1221837 | 6/2017 |
| JP | 2001231017 | 8/2001 |
| JP | 2003319164 | 11/2003 |
| JP | 2004080756 | 3/2004 |
| JP | 2010074242 | 4/2010 |
| JP | 2010539744 | 12/2010 |
| JP | 4726141 | 7/2011 |
| KR | 20080105184 | 12/2008 |
| RU | 2330325 | 7/2008 |
| WO | WO 2005004494 | 1/2005 |
| WO | WO 2006117769 | 11/2006 |

OTHER PUBLICATIONS

Clare, et al. "Sign Data Hiding," JCTVC-G271, 7th Meeting: Geneva, CH, Nov. 21-30, 2011.*

Sole, et al. "Transform Coefficient Coding in HEVC," IEEE Transactions on Circuits and Systems for Video Technology, vol. 22, No. 12, Dec. 2012, pp. 1765-1777.*

Korean Office Action issued in Application No. 10-2016-7032247 dated Nov. 8, 2017, with English Translation, 14 pages.

Chinese Office Action issued in Application No. 201280066211.4, dated Nov. 1, 2017, with English Translation, 13 pages.

Chinese Office Action issued in Application No. 201280066211.4, dated May 18, 2017, with English Translation, 6 pages.

Japanese Office Action in Japanese Application No. 2014-539391, dated Sep. 13, 2016, with English translation, 6 pages.

Japanese Office Action in Japanese Application No. 2014-539392, dated Sep. 13, 2016, with English translation, 6 pages.

Notice of Allowance issued in Korean Application No. 10-2015-7011545 dated Mar. 9, 2018, 13 pages.

Xiaojing et al., "A data hiding algorithm for H.264/AVC videos streams without intra-frame distortion drift," IEEE, Oct. 2010, 20(10):1320-1330.

Zou et al., H. 264 stream replacement watermarking with CABAC encoding. IEEE ICME, Jul. 2010, pp. 117-121.

Amonou et al., "Video coding technology proposal by France Telecom, NTT, NTT DoCoMo, Panasonic and Technicolor", 1st JCTVC meeting, Dresden, Apr. 2010 (JCTVC-A114), 42 pages.

Bossen, "Common test conditions and software reference configurations," 6th JCTVC meeting, Torino, Jul. 2011 (JCTVC-F900), 4 pages.

Bross et al., "WD4: Working Draft 4 of High Efficiency Video Coding," International Organisation for Standardisation (ISO/IEC JTC1/SC29/WG11), Jul. 2011, Torino, IT, 229 pages.

Clare et al., "Sign Data Hiding," JCTVC-G271, 7th Meeting: Geneva, CH, Nov. 21-30, 2011, 9 pages.

Cohen et al., "Low Complexity Embedding of Information in Transform Coefficients", 5th JCTVC meeting, Geneva, Mar. 2011(JCTVC-E428), 7 pages.

Hadar et al., "Rate distortion optimization for efficient watermarking in the OCT domain", Broadband Multimedia Systems and Broadcasting, 2008 IEEE International Symposium on, IEEE, Piscataway, NJ, USA, Mar. 31, 2008 (Mar. 31, 2008), pp. 1-8, XP031268612.

Kim et al., "Data Hiding on H.264/AVC Compressed Video", Image Analysis and Recognition; [Lecture Notes in Computer Science], Springer Berlin Heidelberg, Berlin, Heidelberg, pp. 698-707, XP019097872.

Li et al., "A Reversible Data Hiding Scheme for JPEG Images", Sep. 31, 2010 (Sep. 21, 2010), Advances in Multimedia Information Processing—PCM 2010, Springer Berlin Heidelberg, Berlin, Heidelberg, pp. 653-664, XP019151677.

Ma et al., "A Data Hiding Algorithm for H.264/AVC Video Steams Without Intra-Frame Distortion Drift", IEEE Transactions on Circuits and Systems for Video Technology, IEEE Service Center, Piscataway, NJ, US, vol. 20, No. 10, Oct. 1, 2010 (Oct. 1, 2010), pp. 1320-1330, XP011317382.

Paruchuri et al., "Joint optimization of data hiding and video compression", Circuits and Systems, 2008. ISCAS 2008. IEEE International Symposium on, IEEE, Piscataway, NJ, USA, May 18, 2008 (May 18, 2008), pp. 3021-3024, XP031392649.

(56) References Cited

OTHER PUBLICATIONS

Sole et al., "Transform Coefficient Coding in HEVC," IEEE Transactions on Circuits and Systems for Video Technology, Dec. 2012, 22(12):1765-1777.
Thiesse et al., "Rate Distortion Data Hiding of Motion Vector Competition Information in Chroma and Luma Samples for Video Compression", IEEE Transactions on Circuits and Systems for Video Technology, IEEE Service Center, Piscataway, NJ, US, vol. 21, No. 6, Jun. 1, 2011 (Jun. 1, 2011), pp. 729-741, XP011325921.
Thiesse et al., "Data hiding of Intra prediction information in chroma samples for video compression," Proc. IEEE International Conference on Image Processing, ICIP 2010, pp. 2861-2864, Hong Kong, Sep. 2010.
International Search Report and Written Opinion dated Nov. 6, 2012 for corresponding International Application No. PCT/FR2012/052552 filed Jun. 11, 2012, 28 pages (with English translation).
International Search Report and Written Opinion dated Jan. 31, 2013 for corresponding International Application No. PCT/FR2012/052551, filed Jun. 11, 2012, 25 pages (with English translation).
European Search Report in European Application No. 15185078.1, dated Feb. 1, 2016, 7 pages.
Korean Office Action issued in Application No. 10-2014-7015526 dated Feb. 29, 2016, with English Translation, 9 pages.
Russian Office Action issued in Application No. 2014123342, dated Feb. 10, 2016, with English Translation, 8 pages.
Office Action issued in U.S. Appl. No. 14/492,829 dated Jan. 5, 2015, 11 pages.
Notice of Allowance issued in U.S. Appl. No. 14/492,829 dated Feb. 27, 2015, 7 pages.
Office Action issued in U.S. Appl. No. 14/356,804, dated Nov. 28, 2014, 17 pages.
Office Action issued in U.S. Appl. No. 14/492,950, dated Nov. 26, 2014, 15 pages.
Office Action issued in U.S. Appl. No. 14/356,804 dated May 8, 2015, 13 pages (no new art cited).
Office Action issued in U.S. Appl. No. 14/492,950 dated May 8, 2015, 13 pages (no new art cited).
Office Action issued in U.S. Appl. No. 14/665,163 dated Jun. 19, 2015, 15 pages (no new art cited).
Notice of Allowance issued in U.S. Appl. No. 14/665,163 dated Oct. 20, 2015, 6 pages (no new art cited).
Office Action issued in U.S. Appl. No. 14/356,799 dated Oct. 19, 2015, 19 pages.
Notice of Allowance issued in U.S. Appl. No. 14/492,950 dated Jan. 14, 2016, 10 pages (no new art cited).
Office Action issued in U.S. Appl. No. 15/004,174 dated Mar. 23, 2016, 11 pages.
European Search Report, Application No. 17154805.0, dated Apr. 5, 2017.

* cited by examiner

METHOD OF CODING AND DECODING IMAGES, CODING AND DECODING DEVICE AND COMPUTER PROGRAMS CORRESPONDING THERETO

CROSS-REFERENCE TO RELATED APPLICATIONS

This application is a continuation of U.S. application Ser. No. 15/132,081, filed Apr. 18, 2016, which is a continuation of U.S. application Ser. No. 14/492,950, filed Sep. 22, 2014, which is a continuation of U.S. application Ser. No. 14/356,804, filed May 7, 2014, which is a Section 371 National Stage Application of International Application No. PCT/FR2012/052551, filed Nov. 6, 2012, which claims priority to French Application No. 1160114, filed Nov. 7, 2011, the entirety of each of which are incorporated by reference.

FIELD OF THE INVENTION

The present invention pertains generally to the field of the processing of images, and more precisely to the coding and to the decoding of digital images and of sequences of digital images.

The invention can thus, in particular, be applied to the video coding implemented in current video coders (MPEG, H.264, etc.) or forthcoming video coders (ITU-T/VCEG (H.265) or ISO/MPEG (HEVC).

BACKGROUND OF THE INVENTION

Current video coders (MPEG, H.264, etc.) use a block-wise representation of the video sequence. The images are split up into macro-blocks, each macro-block is itself split up into blocks and each block, or macro-block, is coded by intra-image or inter-image prediction. Thus, certain images are coded by spatial prediction (intra prediction), while other images are coded by temporal prediction (inter prediction) with respect to one or more coded-decoded reference images, with the aid of a motion compensation known by the person skilled in the art.

For each block there is coded a residual block, also called prediction residual, corresponding to the original block decreased by a prediction. The residual blocks are transformed by a transform of discrete cosine transform (DCT) type, and then quantized with the aid of a quantization for example of scalar type. Coefficients, some of which are positive and others negative, are obtained on completion of the quantization step. They are thereafter traversed in an order of reading, generally zig-zag (as in the JPEG standard), thereby making it possible to utilize the significant number of zero coefficients in the high frequencies. On completion of the aforementioned traversal, a one-dimensional list of coefficients is obtained, which will be called "quantized residual". The coefficients of this list are then coded by an entropy coding.

The entropy coding (for example of arithmetical coding or Huffman coding type) is performed in the following manner:
  an item of information is coded entropically to indicate the location of the last non-zero coefficient of the list,
  for each coefficient situated before the last non-zero coefficient, an item of information is coded entropically to indicate whether the coefficient is or is not zero,
  for each previously indicated non-zero coefficient, an item of information is coded entropically to indicate whether the coefficient is or is not equal to one,
  for each non-zero coefficient not equal to one situated before the last non-zero coefficient, an amplitude item of information (absolute value of the coefficient decreased by two) is coded entropically,
  for each non-zero coefficient, the sign which is allotted to it is coded by a '0' (for the + sign) or a '1' (for the − sign).

According to the H.264 technique for example, when a macroblock is split up into blocks, a data signal, corresponding to each block, is transmitted to the decoder. Such a signal comprises:
  the quantized residuals contained in the aforementioned list,
  information representative of the mode of coding used, in particular:
    the mode of prediction (intra prediction, inter prediction, default prediction carrying out a prediction for which no item of information is transmitted to the decoder ("skip"));
    information specifying the type of prediction (orientation, reference image, etc.);
    the type of partitioning;
    the type of transform, for example 4×4 DCT, 8×8 DCT, etc.
    the motion information if necessary;
    etc.

The decoding is done image by image, and for each image, macroblock by macroblock. For each partition of a macroblock, the corresponding elements of the stream are read. The inverse quantization and the inverse transformation of the coefficients of the blocks are performed so as to produce the decoded prediction residual. Next, the prediction of the partition is calculated and the partition is reconstructed by adding the prediction to the decoded prediction residual.

The intra or inter coding by competition, such as implemented in the H.264 standard, thus relies on various items of coding information, such as those aforementioned, being set into competition with the aim of selecting the best mode, that is to say that which will optimize the coding of the partition considered according to a predetermined performance criterion, for example the bitrate/distortion cost well known to the person skilled in the art.

The information representative of the mode of coding selected is contained in the data signal transmitted by the coder to the decoder. The decoder is thus capable of identifying the mode of coding selected at the coder, and then of applying the prediction in accordance with this mode.

In the document "Data Hiding of Motion Information in Chroma and Luma Samples for Video Compression", J.-M. Thiesse, J. Jung and M. Antonini, International workshop on multimedia signal processing, 2011, there is presented a data hiding method implemented in the course of video compression.

More precisely, it is proposed to avoid including in the signal to be transmitted to the decoder at least one competition index such as arises from a plurality of competition indices to be transmitted. Such an index is for example the index MVComp which represents an item of information making it possible to identify the motion vector predictor used for a block predicted in Inter mode. Such an index, which can equal 0 or 1, is not inscribed directly into the coded data signal, but transported by the parity of the sum of the coefficients of the quantized residual. An association is created between the parity of the quantized residual and the index MVComp. By way of example, the even value of the quantized residual is associated with the index MVComp of value 0, while the odd value of the quantized residual is associated with the index MVComp of value 1. Two cases can occur. In a first case, if the parity of the quantized residual already corresponds to that of the index MVComp that it is desired to transmit, the quantized residual is coded in a conventional manner. In a second case, if the parity of the quantized residual is different from that of the index MVComp that it is desired to transmit, there is undertaken a modification of the quantized residual in such a way that its parity is the same as that of the index MVComp. Such a modification consists in incrementing or decrementing one or more coefficients of the quantized residual by an odd value (e.g.: +1, −1, +3, −3, +5, −5, etc.) and to retain only the modification which optimizes a predetermined criterion, in this instance the aforementioned bitrate-distortion cost.

At the decoder, the index MVComp is not read from the signal. The decoder simply makes do with determining the residual conventionally. If the value of this residual is even, the index MVComp is set to 0. If the value of this residual is odd, the index MVComp is set to 1.

In accordance with the technique which has just been presented, the coefficients which undergo the modification are not always chosen in an optimal manner, so that the modification applied gives rise to disturbances in the signal transmitted to the decoder. Such disturbances are inevitably detrimental to the effectiveness of the video compression.

Moreover, the index MVComp does not constitute the most beneficial item of information to be hidden since the probabilities that this index is equal to 0 or to 1 are not equal. Consequently, if this index is coded in a conventional manner by entropy coding, it will be represented, in the compressed file to be transmitted to the decoder, by a smaller quantity of data than one bit per index MVComp transmitted. Consequently, if the index MVComp is transmitted in the parity of the quantized residual, the quantity of data thus saved is smaller than one bit per index MVComp, whereas the parity of the residual could make it possible to transport an item of information of one bit per index.

Consequently, the reduction in the signaling cost, as well as the effectiveness of the compression, are not optimal.

SUMMARY OF THE INVENTION

An embodiment of the present invention relates to a method for coding at least one image split up into partitions, a current partition to be coded containing data at least one data item of which is allotted a sign.

The method according to the invention is noteworthy in that it implements, for the aforementioned current partition, the following steps:
calculation of the value of a function representative of the data of said current partition with the exclusion of the sign,
comparison of the calculated value with a predetermined value of the sign,
as a function of the result of the comparison, modification or otherwise of at least one of the data of the current partition,
in the case of modification, coding of the at least one modified data item.

Such an arrangement makes it possible advantageously to apply the data hiding technique to the signs of the data of a partition to be coded. A sign is indeed an item of information that it is particularly relevant to hide because of the fact that the probability of appearance of a positive or negative sign is equiprobable. Therefore, given that a sign is necessarily coded on a bit, it is thus possible, by hiding this item of information, to make a saving of one bit in the signal to be transmitted to the decoder, thereby substantially reducing the signaling cost.

It should be noted that among the information (sign, amplitude, etc.) associated with an image data item, very few of them are equiprobable. The sign being an equiprobable item of information, there is therefore a specific benefit in hiding an item of information of this type, thereby making it possible to increase the compression performance.

In a particular embodiment, in the case where a plurality of signs is considered in the course of the aforementioned comparison step, the latter consists in comparing the calculated value of a function representative of the data of the current partition with the value of a function representative of the plurality of signs.

Such an arrangement makes it possible to optimize the compression performance of the arithmetical coder while optimizing the reduction in the signaling cost, since it makes it possible to hide several signs in the signal to be transmitted to the decoder.

Correlatively, the invention relates to a device for coding at least one image split up into partitions, a current partition to be coded containing data at least one data item of which is allotted a sign.

Such a coding device is noteworthy in that it comprises processing means which, for the current partition to be coded, are able to:
calculate the value of a function representative of the data of the current partition with the exclusion of the sign,
compare the calculated value with a predetermined value of the sign,
modify or otherwise at least one of the data of the current partition as a function of the result of the comparison,
and in that it comprises means for coding the at least one modified data item, in the case of modification by the processing means.

In a corresponding manner, the invention also relates to a method for decoding a data signal representative of at least one image split up into partitions which has been previously coded, a current partition to be decoded containing data at least one data item of which is allotted a sign.

Such a decoding method is noteworthy in that it comprises, for the current partition, the following steps:
decoding of the data of the current partition, with the exclusion of the sign,
calculation of the value of a function representative of the decoded data of the current partition,
obtaining, on the basis of the calculated value, of the value of the sign.

In a particular embodiment, a plurality of values associated respectively with a plurality of signs is obtained on the basis of the calculated value.

Correlatively, the invention relates to a device for decoding a data signal representative of at least one image split up into partitions which has been previously coded, a current partition to be decoded containing data at least one data item of which is allotted a sign.

Such a decoding device is noteworthy in that it comprises processing means which, for the current partition to be decoded, are able to:
decode the data of the current partition, with the exclusion of the sign,
calculate the value of a function representative of the decoded data of the current partition,
obtain, on the basis of the calculated value, the value of the sign.

The invention is also aimed at a computer program comprising instructions for the execution of the steps of the coding or decoding method hereinabove, when the program is executed by a computer.

Such a program can use any programming language, and be in the form of source code, object code, or of code intermediate between source code and object code, such as in a partially compiled form, or in any other desirable form.

Yet another subject of the invention is also aimed at a recording medium readable by a computer, and comprising instructions for computer program such as mentioned hereinabove.

The recording medium can be any entity or device capable of storing the program. For example, such a medium can comprise a storage means, such as a ROM, for example a CD ROM or a microelectronic circuit ROM, or else a magnetic recording means, for example a diskette (floppy disk) or a hard disk.

Moreover, such a recording medium can be a transmissible medium such as an electrical or optical signal, which can be conveyed via an electrical or optical cable, by radio or by other means. The program according to the invention can be in particular downloaded from a network of Internet type.

Alternatively, such a recording medium can be an integrated circuit into which the program is incorporated, the circuit being adapted to execute the method in question or to be used in the execution of the latter.

The coding device, the decoding method, the decoding device and the aforementioned computer programs exhibit at least the same advantages as those conferred by the coding method according to the present invention.

BRIEF DESCRIPTION OF THE DRAWINGS

Other characteristics and advantages will become apparent on reading two preferred embodiments described with reference to the figures in which.

DETAILED DESCRIPTION OF THE CODING PART

A general embodiment of the invention will now be described, in which the coding method according to the invention is used to code a sequence of images according to a binary stream close to that which is obtained by a coding according to the H.264/MPEG-4 AVC standard. In this embodiment, the coding method according to the invention is for example implemented in a software or hardware manner by modifications of a coder initially complying with the H.264/MPEG-4 AVC standard.

Figure 1:
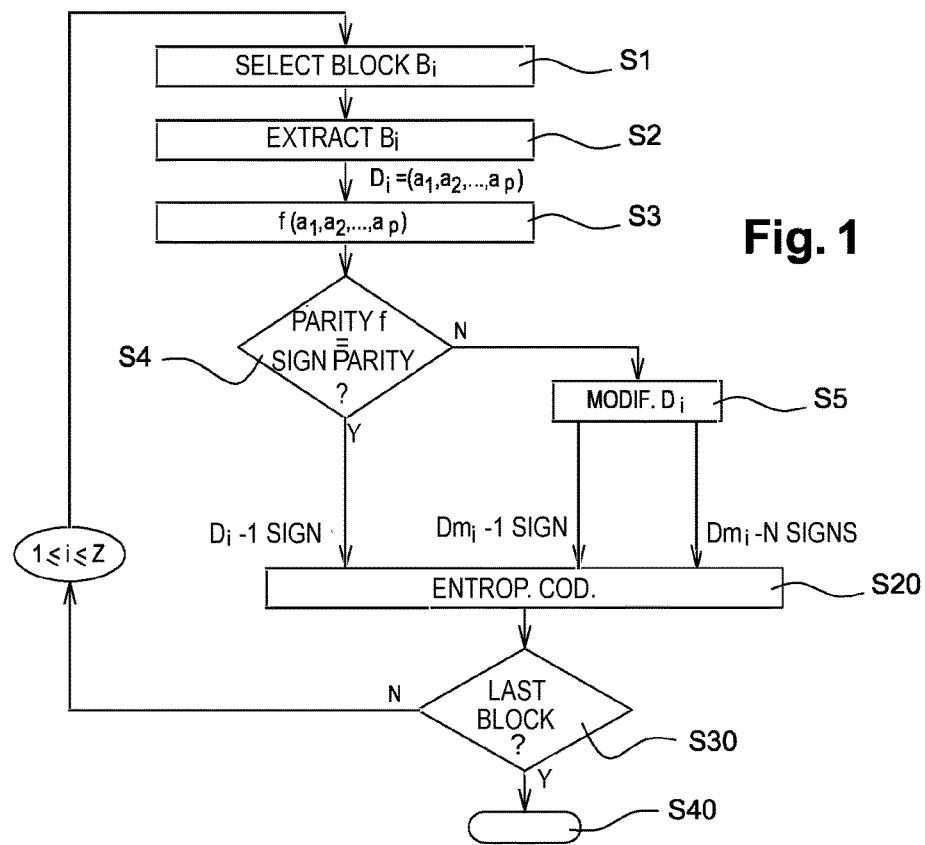
FIG. 1 represents the general steps of the coding method according to the invention.

The coding method according to the invention is represented in the form of an algorithm comprising steps S1 to S40, represented in FIG. 1.

Figure 2:
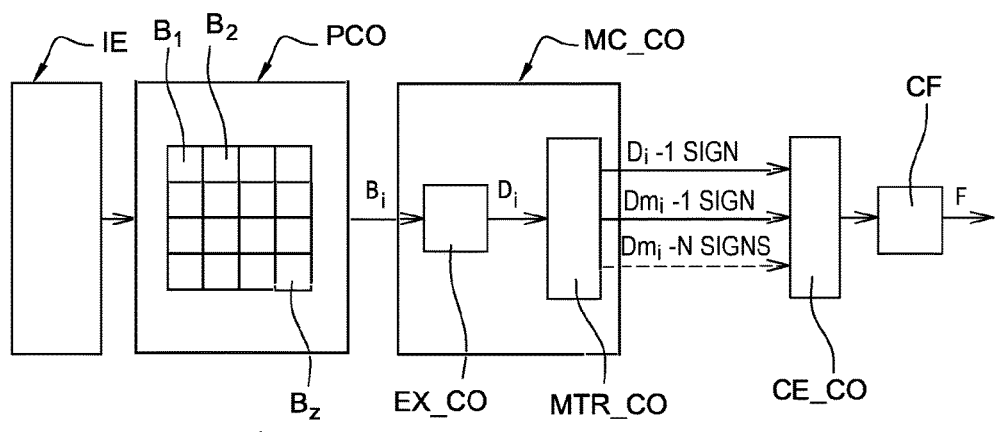
FIG. 2 represents a coding device according to the invention which is able to perform the steps of the coding method of FIG. 1.

According to the embodiment of the invention, the coding method according to the invention is implemented in a coding device or coder CO of which an embodiment is represented in FIG. 2.

In accordance with the invention, there is undertaken, prior to the coding proper, a splitting of an image IE of a sequence of images to be coded in a predetermined order, into a plurality Z of partitions $B_1, B_2, \ldots, B_i, \ldots, B_Z$, as represented in FIG. 2.

It should be noted that, within the meaning of the invention, the term "partition" signifies coding unit. The latter terminology is in particular used in the HEVC/H.265 standard currently being formulated, for example in the document accessible at the following Internet address: http://phenix.int-evry.fr/jct/doc end user/current document.php?id=3286.

In particular, such a coding unit groups together sets of pixels of rectangular or square shape, also called blocks, macroblocks, or else sets of pixels exhibiting other geometric shapes.

In the example represented in FIG. 2, said partitions are blocks which have a square shape and all have the same size. As a function of the size of the image which is not necessarily a multiple of the size of the blocks, the last blocks on the left and the last blocks at the bottom might not be square. In an alternative embodiment, the blocks may be for example of rectangular size and/or not aligned one with another.

Each block or macroblock may moreover itself be divided into sub-blocks which are themselves subdividable.

Such a splitting is performed by a partitioning module PCO represented in FIG. 2 which uses for example a partitioning algorithm well known as such.

Subsequent to said splitting step, there is undertaken the coding of each of the current partitions $B_i$ (i being an integer such that $1 \leq i \leq Z$) of said image IE.

In the example represented in FIG. 2, such a coding is applied successively to each of the blocks $B_1$ to $B_Z$ of the current image IE. The blocks are coded according to for example a traversal such as the "raster scan" traversal well known to the person skilled in the art.

The coding according to the invention is implemented in a coding software module MC_CO of the coder CO, such as represented in FIG. 2.

In the course of a step S1 represented in FIG. 1, the coding module MC_CO of FIG. 2 selects as current block $B_i$ the first block $B_1$ to be coded of the current image IE. As represented in FIG. 2, this is the first left block of the image IE.

In the course of a step S2 represented in FIG. 1, there is undertaken the extraction of data of the current block $B_1$ in the form of a list $D_1=(a_1, a_2, \ldots, a_P)$. Such an extraction is performed by a software module EX_CO such as represented in FIG. 2. Such data are for example pixel data, the non-zero pixel data each being allotted either with a positive sign, or with a negative sign.

Each of the data of the list $D_1$ is associated with various items of digital information which are intended to undergo an entropy coding. Items of digital information such as these are described hereinbelow by way of example:

for each data item situated before the last non-zero data item of the list $D_1$, a digital item of information, such as a bit, is intended to be coded entropically to indicate whether the data item is or is not zero: if the data item is zero, it is for example the bit of value 0 which will be coded, while if the data item is non-zero, it is the bit of value 1 which will be coded;

for each non-zero data item, a digital item of information, such as a bit, is intended to be coded entropically to indicate whether the absolute value of the data item is or is not equal to one: if it is equal to 1, it is for example the bit of value 1 which will be coded, while if it is not equal to 1, it is the bit of value 0 which will be coded;

for each non-zero data item whose absolute value is not equal to one and which is situated before the last non-zero data item, an amplitude item of information is coded entropically, for each non-zero data item, the sign which is allotted to it is coded by a digital item of information, such as a bit for example set to '0' (for the + sign) or to '1' (for the − sign).

The specific coding steps according to the invention will now be described with reference to FIG. 1.

In accordance with the invention, it is decided to avoid entropically coding at least one sign of one of said data of the list $D_1$.

In accordance with the preferred embodiment, it is the sign of the first non-zero data item which is intended to be hidden. Such a sign is for example positive and allotted to the first non-zero data item, such as for example the data item $a_2$.

In the course of a step S3 represented in FIG. 1, the processing module MTR_CO calculates the value of a function f which is representative of the data of the list $D_1$.

In the preferred embodiment where a single sign is intended to be hidden in the signal to be transmitted to the decoder, the function f is the parity of the sum of the data of the list $D_1$.

In the course of a step S4 represented in FIG. 1, the processing module MTR_CO verifies whether the parity of the value of the sign to be hidden corresponds to the parity of the sum of the data of the list $D_1$, by virtue of a convention defined previously at the coder CO.

In the example proposed, said convention is such that a positive sign is associated with a bit of value equal to zero, while a negative sign is associated with a bit of value equal to one.

If, in accordance with the convention adopted in the coder CO according to the invention, the sign is positive, thereby corresponding to a zero coding bit value, and if the sum of the data of the list $D_1$ is even, there is undertaken a step S20 of entropy coding of the data of the aforementioned list $D_1$, with the exception of the sign of the first non-zero data item $a_2$. Such a step S20 is represented in FIG. 1.

If, still in accordance with the convention adopted in the coder CO according to the invention, the sign is negative, thereby corresponding to a one coding bit value, and if the sum of the data of the list $D_1$ is odd, there is also undertaken the step S20 of entropy coding of the data of the aforementioned list $D_1$, with the exception of the sign of the first non-zero data item $a_2$.

If, in accordance with the convention adopted in the coder CO according to the invention, the sign is positive, thereby corresponding to a zero coding bit value, and if the sum of the data of the list $D_1$ is odd, there is undertaken, in the course of a step S5 represented in FIG. 1, a modification of at least one modifiable data item of the list $D_1$.

If, still in accordance with the convention adopted in the coder CO according to the invention, the sign is negative, thereby corresponding to a one coding bit value, and if the sum of the data of the list $D_1$ is even, there is also undertaken step S5 of modifying at least one modifiable data item of the list $D_1$.

According to the invention, a data item is modifiable if the modification of its value does not cause any desynchronization at the decoder, once this modified data item is processed by the decoder. Thus, the processing module MTR_CO is configured initially so as not to modify:

the zero data item or data situated before the first non-zero data item, in such a way that the decoder does not allot the value of the hidden sign to this or these zero data, and for calculation complexity reasons, the zero data item or data situated after the last non-zero data item.

Such a modification operation is performed by the processing module MTR_CO of FIG. 2.

In the proposed exemplary embodiment, it is assumed that the total sum of the data of the list $D_1$ is equal to 5, and is therefore odd. So that the decoder can reconstruct the positive sign allotted to the first non-zero data item $a_2$, without the coder CO having to transmit this data item to the decoder, it is necessary that the parity of the sum become even. Consequently, the processing module MTR_CO tests, in the course of said step S5, various modifications of data of the list $D_1$, all aimed at changing the parity of the sum of the data. In the preferred embodiment, there is undertaken the addition of +1 or −1 to each modifiable data item and the selection, according to a predetermined criterion, of a modification from among all those performed.

A modified list $Dm_1=(a'_1, a'_2, \ldots, a'_P)$ is then obtained, on completion of step S5.

It should be noted that, in the course of this step, certain modifications are prohibited. Thus, in the case where the first non-zero data item equals +1, it would not be possible to add −1 to it, since it would become zero, and it would then lose its characteristic of first non-zero data item of the list $D_1$. The decoder would then subsequently allocate the decoded sign (by calculation of the parity of the sum of the data) to another data item, and there would then be a decoding error.

There is thereafter undertaken step S20 of entropy coding of the data of the aforementioned list $Dm_1$, with the exception of the positive sign of the first non-zero data item $a_2$, which sign is hidden in the parity of the sum of the data.

It should be noted that the set of amplitudes of the data of the list $D_1$ or of the modified list $Dm_1$ is coded before the set of signs, with the exclusion of the sign of the first non-zero data item which is not coded, as was explained hereinabove.

In the course of a following step S30 represented in FIG. 1, the coding module MC_CO of FIG. 2 tests whether the coded current block is the last block of the image IE.

If the current block is the last block of the image IE, in the course of a step S40 represented in FIG. 1, the coding method is terminated.

If such is not the case, there is undertaken the selection of the following block $B_i$ which is then coded in accordance with the aforementioned raster scan order of traversal, by iteration of steps S1 to S20, for $1 \leq i \leq Z$.

Once the entropy coding of all the blocks $B_1$ to $B_Z$ has been carried out, there is undertaken the construction of a signal F representing, in binary form, said coded blocks.

The construction of the binary signal F is implemented in a stream construction software module CF, such as represented in FIG. 2.

The stream F is thereafter transmitted by a communication network (not represented), to a remote terminal. The latter comprises a decoder which will be described in greater detail in the subsequent description.

Another embodiment of the invention will now be described, mainly with reference to FIG. 1.

This other embodiment is distinguished from the previous one solely by the number of signs to be hidden which is N, N being an integer such that N≥2.

For this purpose, the function f is the remainder modulo $2^N$ of the sum of the data of the list $D_1$. It is assumed that in the example proposed, N=2, the two signs to be hidden are the first two signs of the first two non-zero data of the list $D_1$, for example $a_2$ and $a_3$.

In the course of step S4 represented in FIG. 1, the processing module MTR_CO verifies whether the configuration of the N signs, i.e. $2^N$ possible configurations, corresponds to the value of the remainder modulo $2^N$ of the sum of the data of the list $D_1$.

In the example proposed where N=2, there exist $2^2=4$ different configurations of signs.

These four configurations obey a convention at the coder CO, which is for example determined in the following manner:

a remainder equal to zero corresponds to two consecutive positive signs: +, +;

a remainder equal to one corresponds to a consecutive positive sign and negative sign: +, −;

a remainder equal to two corresponds to a consecutive negative sign and positive sign: −, +;

a remainder equal to three corresponds to two consecutive negative signs: −, −.

If the configuration of the N signs corresponds to the value of the remainder modulo $2^N$ of the sum of the data of the list $D_1$, there is undertaken step S20 of entropy coding of the data of the aforementioned list $D_1$, with the exception of the respective sign of the first two non-zero data $a_2$ and $a_3$, which signs are hidden in the parity of the sum modulo $2^N$ of the data of the list $D_1$.

If such is not the case, there is undertaken step S5 of modifying at least one modifiable data item of the list $D_1$. Such a modification is performed by the processing module MTR_CO of FIG. 2 in such a way that the remainder modulo $2^N$ of the sum of the modifiable data of the list $D_1$ attains the value of each of the two signs to be hidden.

A modified list $Dm_1=(a'_1, a'_2, \ldots, a'_P)$ is then obtained.

There is thereafter undertaken step S20 of entropy coding of the data of the aforementioned list $Dm_1$, with the exception of the sign of the first non-zero data item $a_2$ and of the sign of the second non-zero data item $a_3$, which signs are hidden in the parity of the sum modulo $2^N$ of the data.

A particular embodiment of the invention will now be described, in which the coding method according to the invention is still used to code a sequence of images according to a binary stream close to that which is obtained by a coding according to the H.264/MPEG-4 AVC standard. In this embodiment, the coding method according to the invention is for example implemented in a software or hardware manner by modifications of a coder initially complying with the H.264/MPEG-4 AVC standard.

Figure 3:
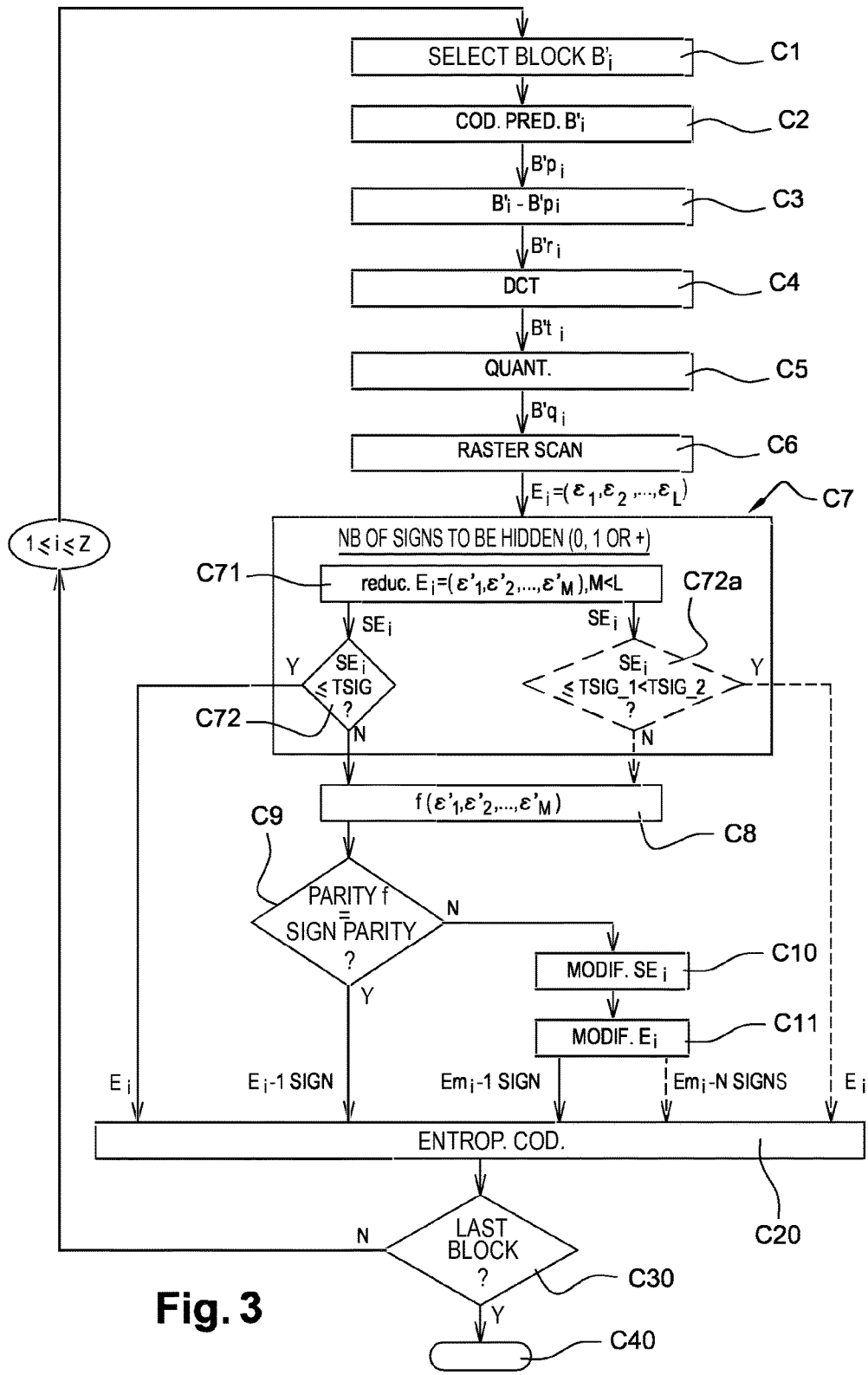
FIG. 3 represents a particular embodiment of the coding method according to the invention.

The coding method according to the invention is represented in the form of an algorithm comprising steps C1 to C40, such as represented in FIG. 3.

Figure 4:
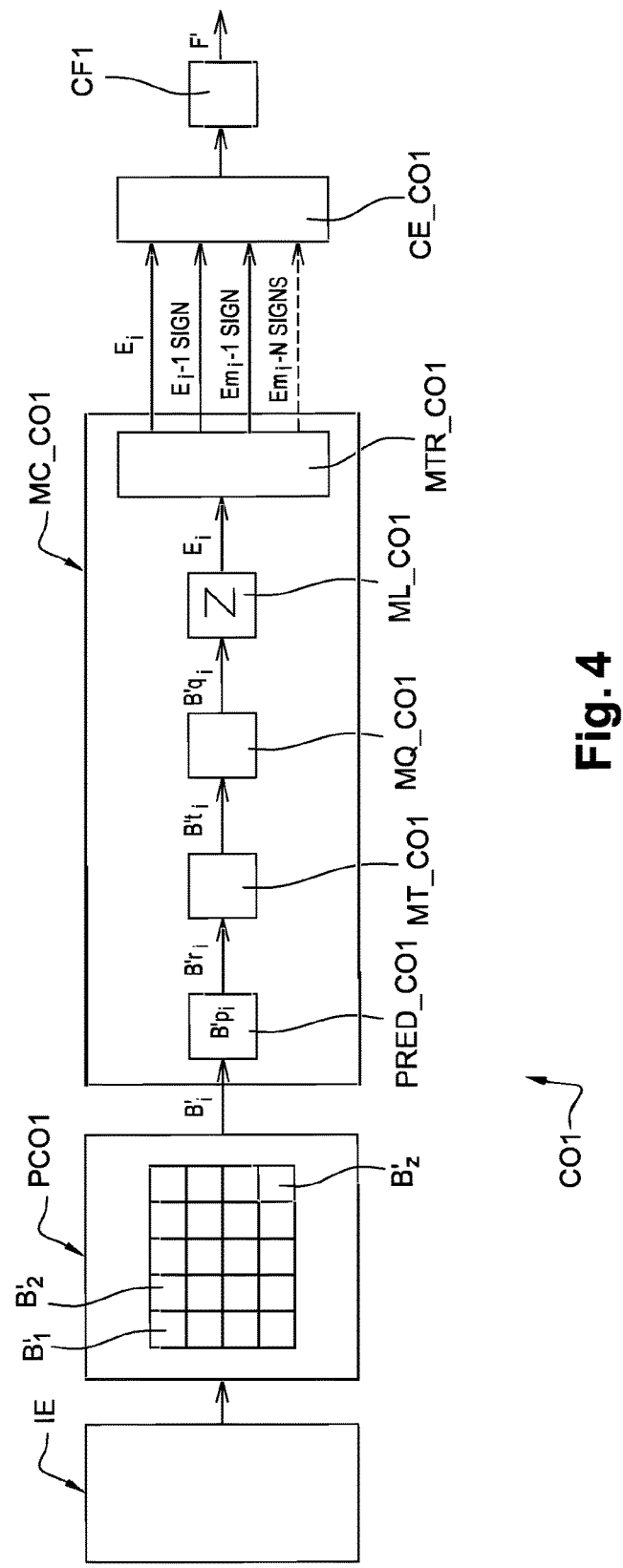
FIG. 4 represents a particular embodiment of a coding device according to the invention.

According to the embodiment of the invention, the coding method is implemented in a coding device or coder CO1 of which an embodiment is represented in FIG. 4.

In accordance with the invention, and as described in the previous examples, there is undertaken, prior to the coding proper, a splitting of an image IE of a sequence of images to be coded in a predetermined order, into a plurality Z of partitions $B'_1, B'_2, \ldots, B'_i, \ldots, B'_Z$, as represented in FIG. 4.

In the example represented in FIG. 4, said partitions are blocks which have a square shape and all have the same size. As a function of the size of the image which is not necessarily a multiple of the size of the blocks, the last blocks on the left and the last blocks at the bottom might not be square. In an alternative embodiment, the blocks may be for example of rectangular size and/or not aligned one with another.

Each block or macroblock may moreover itself be divided into sub-blocks which are themselves subdividable.

Such a splitting is performed by a partitioning software module PCO1 represented in FIG. 4 which is identical to the partitioning module PCO represented in FIG. 2.

Subsequent to said splitting step, there is undertaken the coding of each of the current partitions $B'_i$ (i being an integer such that 1≤i≤Z) of said image IE.

In the example represented in FIG. 4, such a coding is applied successively to each of the blocks $B'_1$ to $B'_Z$ of the current image IE. The blocks are coded according to a traversal such as for example the "raster scan" traversal well known to the person skilled in the art.

The coding according to the invention is implemented in a coding software module MC_CO1 of the coder CO1, such as represented in FIG. 4.

In the course of a step C1 represented in FIG. 3, the coding module MC_CO1 of FIG. 4 selects as current block $B'_i$ the first block $B'_1$ to be coded of the current image IE. As represented in FIG. 4, this is the first left block of the image IE.

In the course of a step C2 represented in FIG. 3, there is undertaken the predictive coding of the current block $B'_1$ by known techniques of intra and/or inter prediction, in the course of which the block $B'_1$ is predicted with respect to at least one previously coded and decoded block. Such a prediction is performed by a prediction software module PRED_CO1 such as represented in FIG. 4.

It goes without saying that other modes of intra prediction, such as are proposed in the H.264 standard, are possible.

The current block $B'_1$ can also be subjected to a predictive coding in inter mode, in the course of which the current block is predicted with respect to a block arising from a previously coded and decoded image. Other types of prediction are of course conceivable. Among the possible predictions for a current block, the optimal prediction is chosen according to a rate distortion criterion well known to the person skilled in the art.

Said aforementioned predictive coding step makes it possible to construct a predicted block $B'p_1$ which is an approximation of the current block $B'_1$. The information relating to this predictive coding is intended to be inscribed in a signal to be transmitted to the decoder. Such information comprises in particular the type of prediction (inter or intra) and, if appropriate, the mode of intra prediction, the type of partitioning of a block or macroblock if the latter has been subdivided, the reference image index and the displacement vector used in the mode of inter prediction. This information is compressed by the coder CO1.

In the course of a following step C3 represented in FIG. 3, the prediction module PRED_CO1 compares the data relating to the current block $B'_1$ with the data of the predicted block $B'p_1$. More precisely, in the course of this step, there is undertaken conventionally the subtraction of the predicted block $B'p_1$ from the current block $B'_1$ to produce a residual block $B'r_1$.

In the course of a following step C4 represented in FIG. 3, there is undertaken the transformation of the residual block $B'r_1$, according to a conventional direct transformation operation, such as for example a discrete cosine transformation DCT, to produce a transformed block $B't_1$. Such an operation is performed by a transform software module MT_CO1, such as represented in FIG. 4.

In the course of a following step C5 represented in FIG. 3, there is undertaken the quantization of the transformed block $B't_1$, according to a conventional quantization operation, such as for example a scalar quantization. A block $B'q_1$ of quantized coefficients is then obtained. Such a step is performed by means of a quantization software module MQ_CO1 such as represented in FIG. 4.

In the course of a following step C6 represented in FIG. 3, there is undertaken a traversal, in a predefined order, of the quantized coefficients of the block $B'q_1$. In the example represented this entails a conventional zig-zag traversal. Such a step is performed by a reading software module ML_CO1 such as represented in FIG. 4. On completion of step C6, a one-dimensional list $E_1 = (\varepsilon 1, \varepsilon 2, \ldots, \varepsilon L)$ of coefficients is obtained, better known by the term "quantized residual", where L is an integer greater than or equal to 1. Each of the coefficients of the list $E_1$ is associated with various items of digital information which are intended to undergo an entropy coding. Such items of digital information are described hereinbelow by way of example.

Let us assume that, in the example represented, L=16 and that the list $E_1$ contains the following sixteen coefficients: $E_1 = (0, +9, -7, 0, 0, +1, 0, -1, +2, 0, 0, +1, 0, 0, 0, 0)$.

In this instance:

for each coefficient situated before the last non-zero coefficient of the list $E_1$, a digital item of information, such as a bit, is intended to be coded entropically to indicate whether the coefficient is or is not zero: if the coefficient is zero, it is for example the bit of value 0 which will be coded, while if the coefficient is non-zero, it is the bit of value 1 which will be coded;

for each non-zero coefficient +9, −7, +1, −1, +2, +1, a digital item of information, such as a bit, is intended to be coded entropically to indicate whether the absolute value of the coefficient is or is not equal to one: if it is equal to 1, it is for example the bit of value 1 which will be coded, while if it is not equal to 1, it is the bit of value 0 which will be coded;

for each non-zero coefficient whose absolute value is not equal to one and situated before the last non-zero coefficient, such as the coefficients of value +9, −7, +2, an amplitude item of information (absolute value of the coefficient from which the value two is deducted) is coded entropically, for each non-zero coefficient, the sign which is allotted to it is coded by a digital item of information, such as a bit for example set to '0' (for the + sign) or to '1' (for the − sign).

The specific coding steps according to the invention will now be described with reference to FIG. 3.

In accordance with the invention, it is decided to avoid entropically coding at least one of the aforementioned items of digital information, which is at least one sign of one of said coefficients of the list $E_1$.

For this purpose, in the course of a step C7 represented in FIG. 3, there is undertaken the choice of the number of signs to be hidden in the course of the subsequent entropy coding step. Such a step is performed by a processing software module MTR_CO1, such as represented in FIG. 4.

In the preferred embodiment, the number of signs to be hidden is one or zero. Furthermore, in accordance with said preferred embodiment, it is the sign of the first non-zero coefficient which is intended to be hidden. In the example represented, this therefore entails hiding the sign of the coefficient $\varepsilon 2 = +9$.

In an alternative embodiment, the number of signs to be hidden is either zero, or one, or two, or three, or more.

In accordance with the preferred embodiment of step C7, there is undertaken, in the course of a first sub-step C71 represented in FIG. 3, the determination, on the basis of said list $E_1$, of a sub-list $SE_1$ containing coefficients able to be modified $\varepsilon'1, \varepsilon'2, \ldots, \varepsilon'M$ where M<L. Such coefficients will be called modifiable coefficients in the subsequent description.

According to the invention, a coefficient is modifiable if the modification of its quantized value does not cause any desynchronization at the decoder, once this modified coefficient is processed by the decoder. Thus, the processing module MTR_CO1 is configured initially so as not to modify:

the zero coefficient or coefficients situated before the first non-zero coefficient, in such a way that the decoder does not allot the value of the hidden sign to this or these zero coefficients, and for calculation complexity reasons, the zero coefficient or coefficients situated after the last non-zero coefficient.

In the example represented, on completion of sub-step C71, the sub-list $SE_1$ obtained is such that $SE_1 = (9, -7, 0, 0, 1, 0, -1, 2, 0, 0, 1)$. Consequently, eleven modifiable coefficients are obtained.

In the course of a following sub-step C72 represented in FIG. 3, the processing module MTR_CO1 undertakes the comparison of the number of modifiable coefficients with a predetermined threshold TSIG. In the preferred embodiment, TSIG equals 4.

If the number of modifiable coefficients is less than the threshold TSIG, there is undertaken, in the course of a step C20 represented in FIG. 3, a conventional entropy coding of the coefficients of the list $E_1$, such as that carried out for example in a CABAC coder, designated by the reference CE_CO1 in FIG. 4. For this purpose, the sign of each non-zero coefficient of the list $E_1$ is coded entropically.

If the number of modifiable coefficients is greater than the threshold TSIG, in the course of a step C8 represented in FIG. 3, the processing module MTR_CO1 calculates the value of a function f which is representative of the coefficients of the sub-list $SE_1$.

In the preferred embodiment where a single sign is intended to be hidden in the signal to be transmitted to the decoder, the function f is the parity of the sum of the coefficients of the sub-list $SE_1$.

In the course of a step C9 represented in FIG. 3, the processing module MTR_CO1 verifies whether the parity of the value of the sign to be hidden corresponds to the parity of the sum of the coefficients of the sub-list $SE_1$, by virtue of a convention defined previously at the coder CO1.

In the example proposed, said convention is such that a positive sign is associated with a bit of value equal to zero, while a negative sign is associated with a bit of value equal to one.

If, in accordance with the convention adopted in the coder CO1 according to the invention, the sign is positive, thereby corresponding to a zero coding bit value, and if the sum of the coefficients of the sub-list $SE_1$ is even, there is undertaken the step C20 of entropy coding of the coefficients of the aforementioned list $E_1$, with the exception of the sign of the coefficient ε2.

If, still in accordance with the convention adopted in the coder CO1 according to the invention, the sign is negative, thereby corresponding to a one coding bit value, and if the sum of the coefficients of the sub-list $SE_1$ is odd, there is also undertaken the step C20 of entropy coding of the coefficients of the aforementioned list $E_1$, with the exception of the sign of the coefficient ε2.

If, in accordance with the convention adopted in the coder CO1 according to the invention, the sign is positive, thereby corresponding to a zero coding bit value, and if the sum of the coefficients of the sub-list $SE_1$ is odd, there is undertaken, in the course of a step C10 represented in FIG. 3, a modification of at least one modifiable coefficient of the sub-list $SE_1$.

If, still in accordance with the convention adopted in the coder CO1 according to the invention, the sign is negative, thereby corresponding to a one coding bit value, and if the sum of the coefficients of the sub-list $SE_1$ is even, there is also undertaken step C10 of modifying at least one modifiable coefficient of the sub-list $SE_1$.

Such a modification operation is performed by the processing module MTR_CO1 of FIG. 4.

In the exemplary embodiment where $SE_1$=(+9, −7, 0, 0, +1, 0, −1, +2, 0, 0, +1), the total sum of the coefficient is equal to 5, and is therefore odd. So that the decoder can reconstruct the positive sign allotted to the first non-zero coefficient, ε2=+9, without the coder CO1 having to transmit this coefficient to the decoder, the parity of the sum must become even. Consequently, the processing module MTR_CO1 tests, in the course of said step C10, various modifications of coefficients of the sub-list $SE_1$, all aimed at changing the parity of the sum of the coefficients. In the preferred embodiment, there is undertaken the addition of +1 or −1 to each modifiable coefficient and the selection of a modification from among all those performed.

In the preferred embodiment, such a selection constitutes the optimal prediction according to a performance criterion which is for example the bitrate distortion criterion well known to the person skilled in the art. Such a criterion is expressed by equation (1) hereinbelow:

$$J=D+\lambda R \quad (1)$$

where D represents the distortion between the original macroblock and the reconstructed macroblock, R represents the cost in bits of the coding of the coding information and λ represents a Lagrange multiplier, the value of which can be fixed prior to the coding.

In the example proposed, the modification which gives rise to an optimal prediction according to the aforementioned bitrate-distortion criterion is the addition of the value 1 to the second coefficient −7 of the sub-list $SE_1$.

A modified sub-list $SEm_1$=(+9, −6, 0, 0, +1, 0, −1, +2, 0, 0, +1) is then obtained on completion of step C10.

It should be noted that in the course of this step, certain modifications are prohibited. Thus, in the case where the first non-zero coefficient ε2 would have been equal to +1, it would not have been possible to add −1 to it, since it would have become zero, and it would then have lost its characteristic of first non-zero coefficient of the list $E_1$. The decoder would then have subsequently allocated the decoded sign (by calculation of the parity of the sum of the coefficients) to another coefficient, and there would then have been a decoding error.

In the course of a step C11 represented in FIG. 3, the processing module MTR_CO1 undertakes a corresponding modification of the list $E_1$. The following modified list $Em_1$=(0, +9, −6, 0, 0, +1, 0, −1, +2, 0, 0, +1, 0, 0, 0, 0) is then obtained.

There is thereafter undertaken the step C20 of entropy coding of the coefficients of the aforementioned list $Em_1$, with the exception of the sign of the coefficient ε2, which is the + sign of the coefficient 9 in the example proposed, which sign is hidden in the parity of the sum of the coefficients.

It should be noted that the set of amplitudes of the coefficients of the list $E_1$ or of the modified list $Em_1$ is coded before the set of signs, with the exclusion of the sign of the first non-zero coefficient ε2 which is not coded, as has been explained hereinabove.

In the course of a following step C30 represented in FIG. 3, the coding module MC_CO1 of FIG. 4 tests whether the coded current block is the last block of the image IE.

If the current block is the last block of the image IE, in the course of a step C40 represented in FIG. 3, the coding method is terminated.

If such is not the case, there is undertaken the selection of the block following $B'_1$ which is then coded in accordance with the aforementioned raster scan order of traversal, by iteration of steps C1 to C20, for $1 \le i \le Z$.

Once the entropy coding of all the blocks $B'_1$ to $B'_Z$ has been carried out, there is undertaken the construction of a signal F' representing, in binary form, said coded blocks.

The construction of the binary signal F' is implemented in a stream construction software module CF1, such as represented in FIG. 4.

The stream F' is thereafter transmitted by a communication network (not represented), to a remote terminal. The latter comprises a decoder which will be described in greater detail in the subsequent description.

Another embodiment of the invention will now be described, mainly with reference to FIG. 3.

This other embodiment is distinguished from the previous one solely by the number of coefficients to be hidden which is either 0, or N, N being an integer such that $N \ge 2$.

For this purpose, the aforementioned comparison sub-step C72 is replaced with sub-step C72a represented dashed in FIG. 3, in the course of which there is undertaken the comparison of the number of modifiable coefficients with several predetermined thresholds $0<TSIG\_1<TSIG\_2<TSIG\_3 \ldots$, in such a way that if the number of modifiable coefficients lies between TSIG_N and TSIG_N+1, N signs are intended to be hidden.

If the number of modifiable coefficients is less than the first threshold TSIG_1, there is undertaken, in the course of the aforementioned step C20, the conventional entropy coding of the coefficients of the list $E_1$. For this purpose, the sign of each non-zero coefficient of the list $E_1$ is coded entropically.

If the number of modifiable coefficients lies between the threshold TSIG_N and TSIG_N+1, in the course of a step C8 represented in FIG. 3, the processing module MTR_CO1 calculates the value of a function f which is representative of the coefficients of the sub-list $SE_1$.

In this other embodiment, the decision at the coder being to hide N signs, the function f is the remainder modulo $2^N$ of the sum of the coefficients of the sub-list $SE_1$. It is assumed that in the example proposed, N=2, the two signs to be hidden are the first two signs of the first two non-zero coefficients respectively, namely ε2 and ε3.

In the course of the following step C9 represented in FIG. 3, the processing module MTR_CO1 verifies whether the configuration of the N signs, i.e. $2^N$ possible configurations, corresponds to the value of the remainder modulo $2^N$ of the sum of the coefficients of the sub-list $SE_1$.

In the example proposed where N=2, there exist $2^2=4$ different configurations of signs.

These four configurations obey a convention at the coder CO1, which is for example determined in the following manner:

a remainder equal to zero corresponds to two consecutive positive signs: +, +;

a remainder equal to one corresponds to a consecutive positive sign and negative sign: +, −;

a remainder equal to two corresponds to a consecutive negative sign and positive sign: −, +;

a remainder equal to three corresponds to two consecutive negative signs: −, −.

If the configuration of the N signs corresponds to the value of the remainder modulo $2^N$ of the sum of the coefficients of the sub-list $SE_1$, there is undertaken the step C20 of entropy coding of the coefficients of the aforementioned list $E_1$, with the exception of the sign of the coefficient ε2 and of the coefficient ε3, which signs are hidden in the parity of the sum modulo $2^N$ of the coefficients.

If such is not the case, there is undertaken step C10 of modifying at least one modifiable coefficient of the sub-list $SE_1$. Such a modification is performed by the processing module MTR_CO1 of FIG. 4, in such a way that the remainder modulo $2^N$ of the sum of the modifiable coefficients of the sub-list $SE_1$ attains the value of each of the two signs to be hidden.

In the course of the aforementioned step C11, the processing module MTR_CO1 undertakes a corresponding modification of the list $E_1$. A modified list $Em_1$ is then obtained.

There is thereafter undertaken step C20 of entropy coding of the coefficients of the aforementioned list $Em_1$, with the exception of the sign of the coefficient ε2 and of the sign of the coefficient ε3, which signs are hidden in the parity of the sum modulo $2^N$ of the coefficients.

Detailed Description of the Decoding Part

A general embodiment of the decoding method according to the invention will now be described, in which the decoding method is implemented in a software or hardware manner by modifications of a decoder initially complying with the H.264/MPEG-4 AVC standard.

Figure 5:
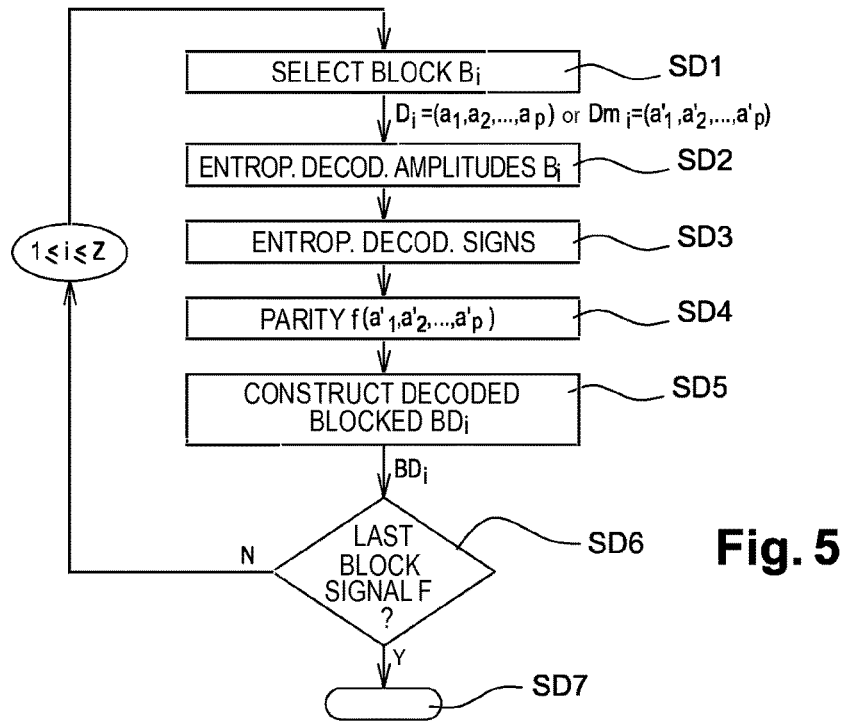
FIG. 5 represents the general steps of the decoding method according to the invention.

The decoding method according to the invention is represented in the form of an algorithm comprising steps SD1 to SD7 represented in FIG. 5.

Figure 6:
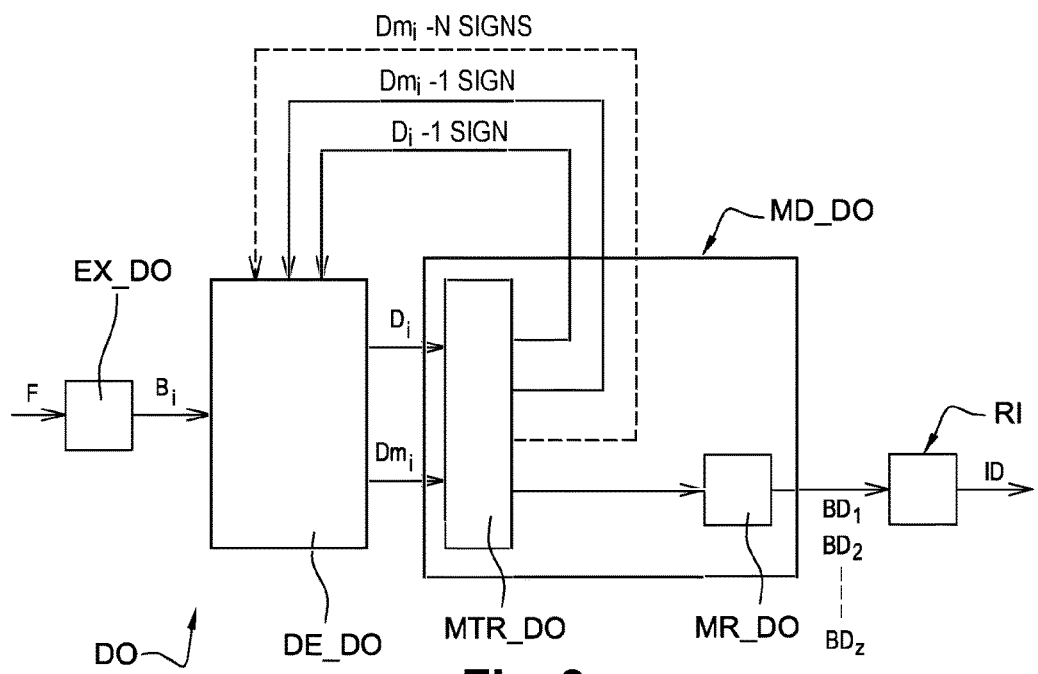
FIG. 6 represents a decoding device according to the invention which is able to perform the steps of the decoding method of FIG. 5.

According to the general embodiment of the invention, the decoding method according to the invention is implemented in a decoding device or decoder DO, such as represented in FIG. 6, which is suitable for receiving the stream F delivered by the coder CO of FIG. 2.

In the course of a preliminary step, not represented in FIG. 5, there is undertaken the identification, in the data signal F received, of the partitions $B_1$ to $B_Z$ which have been coded previously by the coder CO. In the preferred embodiment, said partitions are blocks which have a square shape and all have the same size. As a function of the size of the image which is not necessarily a multiple of the size of the blocks, the last blocks on the left and the last blocks at the bottom may not be square. In an alternative embodiment, the blocks may be for example of rectangular size and/or not aligned one with another.

Each block or macroblock may moreover itself be divided into sub-blocks which are themselves subdividable.

Such an identification is performed by a stream analysis software module EX_DO, such as represented in FIG. 6.

In the course of a step SD1 represented in FIG. 5, the module EX_DO of FIG. 6 selects as current block $B_i$ the first block $B_1$ to be decoded. Such a selection consists for example in placing a pointer for reading in the signal F at the start of the data of the first block $B_1$.

There is thereafter undertaken the decoding of each of the selected coded blocks.

In the example represented in FIG. 5, such a decoding is applied successively to each of the coded blocks $B_1$ to $B_Z$. The blocks are decoded according to for example a "raster scan" traversal well known to the person skilled in the art.

The decoding according to the invention is implemented in a decoding software module MD_DO of the decoder DO, such as represented in FIG. 6.

In the course of a step SD2 represented in FIG. 5, there is firstly undertaken the entropy decoding of the first current block $B_1$ which has been selected. Such an operation is performed by an entropy decoding module DE_DO represented in FIG. 6, for example of CABAC type. In the course of this step, the module DE_DO performs an entropy decoding of the items of digital information corresponding to the amplitude of each of the coded data of the list $D_1$ or of the modified list $Dm_1$. At this juncture, only the signs of the data of the list $D_1$ or of the modified list $Dm_1$ are not decoded.

In the case where the processing module MTR_DO receives the list $D_1=(a_1, a_2, \ldots, a_P)$, there is undertaken, in the course of a step SD3 represented in FIG. 5, a conventional entropy decoding of all the signs of the data of the list $D_1$. Such a decoding is performed by the CABAC decoder, designated by the reference DE_DO in FIG. 6. For this purpose, the sign of each non-zero data item of the list $D_1$ is decoded entropically.

In the case where the processing module MTR_DO receives the modified list $Dm_1=(a'_1, a'_2, \ldots, a'_P)$, there is undertaken, in the course of said step SD3, the conventional entropy decoding of all the signs of the data of the list $Dm_1$, with the exception of the sign of the first non-zero data item a2.

In the course of a step SD4 represented in FIG. 5, the processing module MTR_DO calculates the value of a function f which is representative of the data of the list $Dm_1$, so as to determine whether the calculated value is even or odd.

In the preferred embodiment where a single sign is hidden in the signal F, the function f is the parity of the sum of the data of the list $Dm_1$.

In accordance with the convention used at the coder CO, which is the same at the decoder DO, an even value of the sum of the data of the list $Dm_1$ signifies that the sign of the first non-zero data item of the modified list $Dm_1$ is positive, while an odd value of the sum of the data of the list $Dm_1$ signifies that the sign of the first non-zero data item of the modified list $Dm_1$ is negative.

In the exemplary embodiment, the total sum of the data is even. Consequently, on completion of step SD4, the processing module MTR_DO deduces therefrom that the hidden sign of the first non-zero data item a2 is positive.

In the course of a step SD5 represented in FIG. 5, there is undertaken the construction of the decoded block $BD_1$. Such an operation is performed by a reconstruction software module MR_DO represented in FIG. 6.

In the course of a step SD6 represented in FIG. 5, the decoding module MD_DO tests whether the decoded current block is the last block identified in the signal F.

If the current block is the last block of the signal F, in the course of a step SD7 represented in FIG. 5, the decoding method is terminated.

If such is not the case, there is undertaken the selection of the following block $B_i$ to be decoded, in accordance with the aforementioned raster scan order of traversal, by iteration of steps SD1 to SD5, for $1 \leq i \leq Z$.

Another embodiment of the invention will now be described, mainly with reference to FIG. 5.

This other embodiment is distinguished from the previous one solely by the number of hidden signs which is now equal to N, N being an integer such that $N \geq 2$.

For this purpose, in the course of the aforementioned step SD3, there is undertaken the conventional entropy decoding of all the signs of the data of the list $Dm_1$, with the exception of the N respective signs of the first few non-zero data of said modified list $Dm_1$, said N signs being hidden.

In this other embodiment, the processing module MTR_DO calculates, in the course of step SD4, the value of the function f which is the remainder modulo $2^N$ of the sum of the data of the list $Dm_1$. It is assumed that in the example proposed, N=2.

The processing module MTR_DO then deduces therefrom the configuration of the two hidden signs which are allotted respectively to each of the first two non-zero data a2 and a3, according to the convention used on coding.

Once these two signs have been reconstructed, there is undertaken the implementation of steps SD5 to SD7 described hereinabove.

A particular embodiment of the decoding method according to the invention will now be described, in which the decoding method is implemented in a software or hardware manner by modifications of a decoder initially complying with the H.264/MPEG-4 AVC standard.

Figure 7:
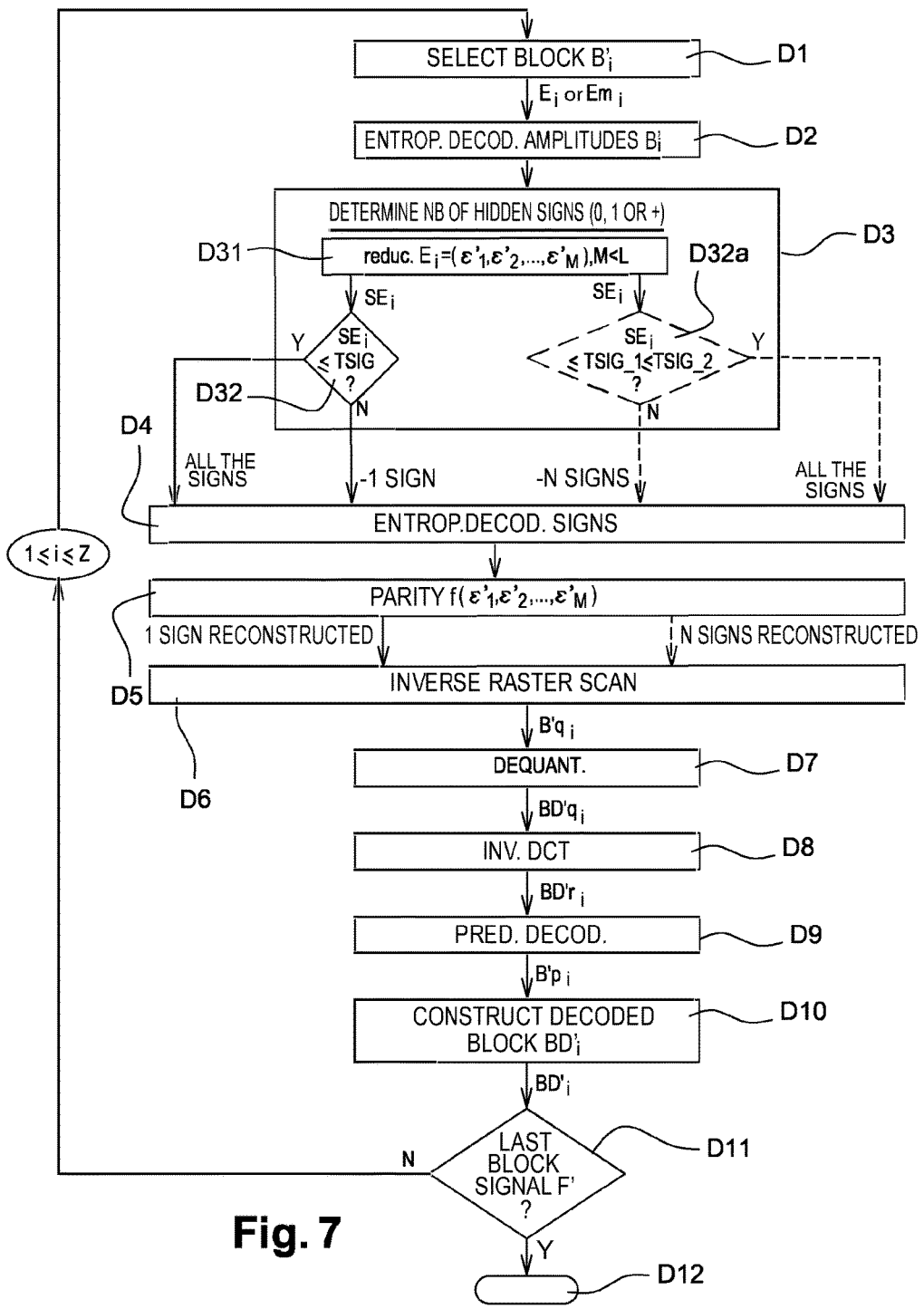
FIG. 7 represents a particular embodiment of the decoding method according to the invention.

The decoding method according to the invention is represented in the form of an algorithm comprising steps D1 to D12 represented in FIG. 7.

Figure 8:
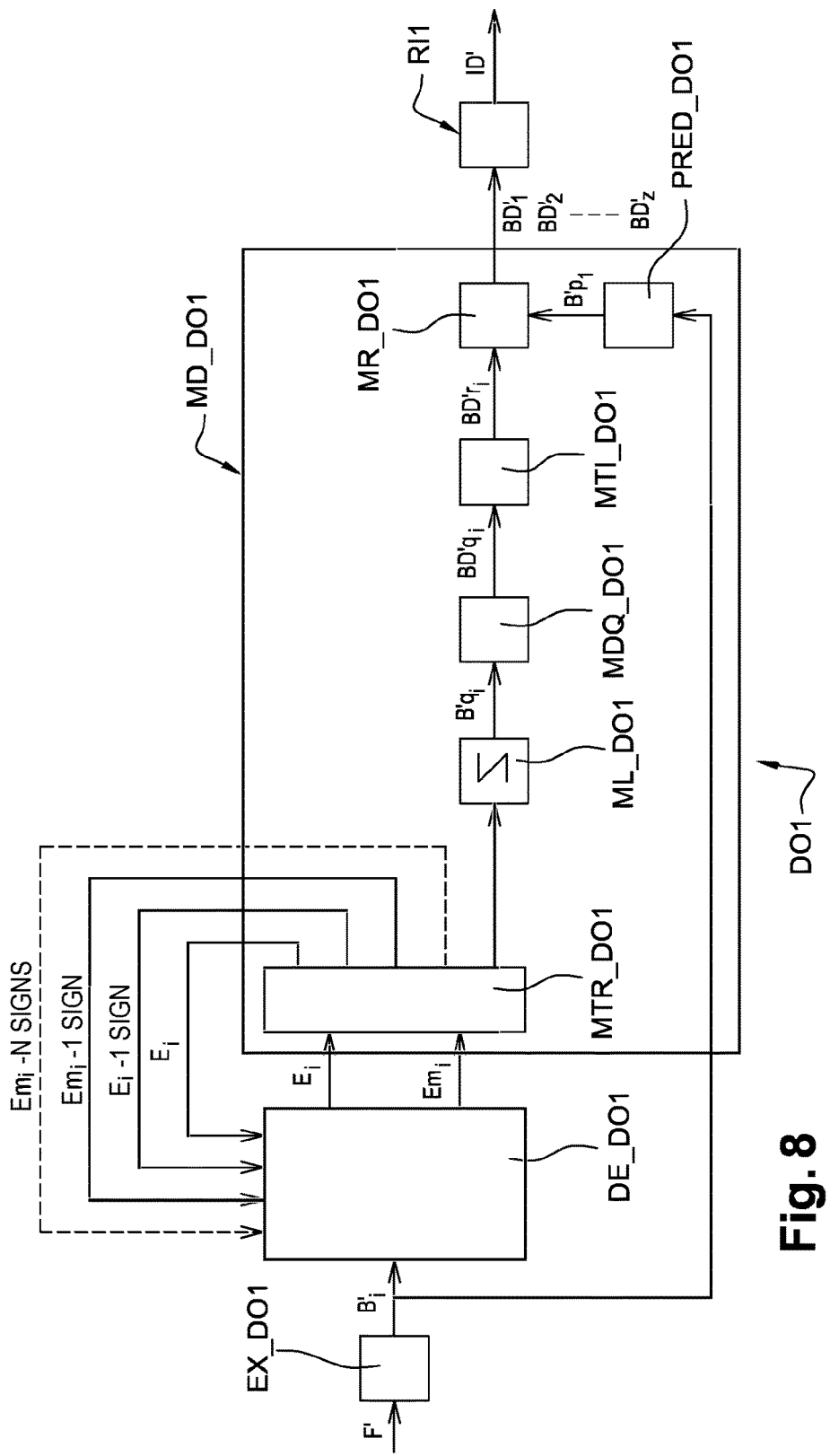
FIG. 8 represents a particular embodiment of a decoding device according to the invention.

According to the embodiment of the invention, the decoding method according to the invention is implemented in a decoding device or decoder DO1, such as represented in FIG. 8, which is able to process the signal F' delivered by the coder CO1 of FIG. 4.

In the course of a preliminary step, not represented in FIG. 7, there is undertaken the identification, in the data signal F' received, of the partitions $B'_1$ to $B'_Z$ which have been coded previously by the coder CO1. In the preferred embodiment, said partitions are blocks which have a square shape and all have the same size. As a function of the size of the image which is not necessarily a multiple of the size of the blocks, the last blocks on the left and the last blocks at the bottom may not be square. In an alternative embodiment, the blocks may be for example of rectangular size and/or not aligned one with another.

Each block or macroblock may moreover itself be divided into sub-blocks which are themselves subdividable.

Such an identification is performed by a stream analysis software module EX_DO1, such as represented in FIG. 8.

In the course of a step D1 represented in FIG. 7, the module EX_DO1 of FIG. 8 selects as current block $B'_1$ the first block $B'_1$ to be decoded. Such a selection consists for example in placing a pointer for reading in the signal F' at the start of the data of the first block $B'_1$.

There is thereafter undertaken the decoding of each of the selected coded blocks.

In the example represented in FIG. 7, such a decoding is applied successively to each of the coded blocks $B'_1$ to $B'_Z$. The blocks are decoded according to for example a "raster scan" traversal well known to the person skilled in the art.

The decoding according to the invention is implemented in a decoding software module MD_DO1 of the decoder DO1, such as represented in FIG. 8.

In the course of a step D2 represented in FIG. 7, there is firstly undertaken the entropy decoding of the first current block $B'_1$ which has been selected. Such an operation is performed by an entropy decoding module DE_DO1 represented in FIG. 8, for example of CABAC type. In the course of this step, the module DE_DO1 performs an entropy decoding of the digital information corresponding to the amplitude of each of the coded coefficients of the list $E_1$ or of the modified list $Em_1$. At this juncture, only the signs of the coefficients of the list $E_1$ or of the modified list $Em_1$ are not decoded.

In the course of a step D3 represented in FIG. 7, there is undertaken the determination of the number of signs liable to have been hidden in the course of the previous step of entropy coding C20. Such a step D3 is performed by a processing software module MTR_DO1, such as represented in FIG. 8. Step D3 is similar to the aforementioned step C7 of determining the number of signs to be hidden.

In the preferred embodiment, the number of hidden signs is one or zero. Furthermore, in accordance with said preferred embodiment, it is the sign of the first non-zero coefficient which is hidden. In the example represented, this therefore entails the positive sign of the coefficient ε2=+9.

In an alternative embodiment, the number of hidden signs is either zero, or one, or two, or three, or more.

In accordance with the preferred embodiment of step D3, there is undertaken, in the course of a first sub-step D31 represented in FIG. 7, the determination, on the basis of said list $E_1$ or of the modified list Em1, of a sub-list containing coefficients ε'1, ε'2, . . . , ε'M where M<L liable to have been modified on coding.

Such a determination is performed in the same manner as in the aforementioned coding step C7.

Like the aforementioned processing module MTR_CO1, the processing module MTR_DO1 is configured initially so as not to modify:

the zero coefficient or coefficients situated before the first non-zero coefficient, and for calculation complexity reasons, the zero coefficient or coefficients situated after the last non-zero coefficient.

In the example represented, on completion of sub-step D31, this entails the sub-list $SEm_1$ such that $SEm_1$=(9, −6, 0, 0, 1, 0, −1, 2, 0, 0, 1). Consequently, eleven coefficients liable to have been modified are obtained.

In the course of a following sub-step D32 represented in FIG. 7, the processing module MTR_DO1 undertakes the comparison of the number of coefficients liable to have been modified with a predetermined threshold TSIG. In the preferred embodiment, TSIG equals 4.

If the number of coefficients liable to have been modified is less than the threshold TSIG, there is undertaken, in the course of a step D4 represented in FIG. 7, a conventional entropy decoding of all the signs of the coefficients of the list $E_1$. Such a decoding is performed by the CABAC decoder, designated by the reference DE_DO1 in FIG. 8. For this purpose, the sign of each non-zero coefficient of the list $E_1$ is decoded entropically.

If the number of coefficients liable to have been modified is greater than the threshold TSIG, there is undertaken, in the course of said step D4, the conventional entropy decoding of all the signs of the coefficients of the list $Em_1$, with the exception of the sign of the first non-zero coefficient $\varepsilon 2$.

In the course of a step D5 represented in FIG. 7, the processing module MTR_DO1 calculates the value of a function f which is representative of the coefficients of the sub-list $SEm_1$ so as to determine whether the calculated value is even or odd.

In the preferred embodiment where a single sign is hidden in the signal F', the function f is the parity of the sum of the coefficients of the sub-list $SEm_1$.

In accordance with the convention used at the coder CO1, which is the same at the decoder DO1, an even value of the sum of the coefficients of the sub-list $SEm_1$ signifies that the sign of the first non-zero coefficient of the modified list $Em_1$ is positive, while an odd value of the sum of the coefficients of the sub-list $SEm_1$ signifies that the sign of the first non-zero coefficient of the modified list $Em_1$ is negative.

In the exemplary embodiment where $SEm_1$=(+9, −6, 0, 0, +1, 0, −1, +2, 0, 0, +1), the total sum of the coefficients is equal to 6, and is therefore even. Consequently, on completion of step D5, the processing module MTR_DO1 deduces therefrom that the hidden sign of the first non-zero coefficient $\varepsilon 2$ is positive.

In the course of a step D6 represented in FIG. 7, and with the aid of all the items of digital information reconstructed in the course of steps D2, D4 and D5, there is undertaken the reconstruction of the quantized coefficients of the block $B'q1$ in a predefined order. In the example represented, this entails a zig-zag traversal inverse to the zig-zag traversal performed in the course of the aforementioned coding step C6. Such a step is performed by a reading software module ML_DO1, such as represented in FIG. 8. More precisely, the module ML_DO1 undertakes the writing of the coefficients of the list $E_1$ (one-dimensional) to the block $B'q_1$ (two-dimensional), using said inverse zig-zag order of traversal.

In the course of a step D7 represented in FIG. 7, there is undertaken the dequantization of the quantized residual block $B'q_1$ according to a conventional dequantization operation which is the operation inverse to the quantization performed on coding in the aforementioned step C5, so as to produce a decoded dequantized block $BD'q_1$. Such a step is performed by means of a dequantization software module MDQ_DO1, such as represented in FIG. 8.

In the course of a step D8 represented in FIG. 7, there is undertaken the inverse transformation of the dequantized block $BD'q_1$ which is the operation inverse to the direct transformation performed on coding in the aforementioned step C4. A decoded residual block $BD'r_1$ is then obtained. Such an operation is performed by an inverse transform software module MTI_DO1, such as represented in FIG. 8.

In the course of a step D9 represented in FIG. 7, there is undertaken the predictive decoding of the current block $B'_1$. A predictive decoding such as this is performed conventionally by known techniques of intra and/or inter prediction, in the course of which the block $B'_1$ is predicted with respect to at least one previously decoded block. Such an operation is performed by a predictive decoding module PRED_DO1 such as represented in FIG. 8.

It goes without saying that other modes of intra prediction, such as are proposed in the H.264 standard, are possible.

In the course of this step, the predictive decoding is performed with the aid of the syntax elements decoded in the previous step and comprising in particular the type of prediction (inter or intra) and, if appropriate, the mode of intra prediction, the type of partitioning of a block or macroblock if the latter has been subdivided, the reference image index and the displacement vector used in the mode of inter prediction.

Said aforementioned predictive decoding step makes it possible to construct a predicted block $B'p_1$.

In the course of a step D10 represented in FIG. 7, there is undertaken the construction of the decoded block $BD'_1$ by adding the decoded residual block $BD'r_1$ to the predicted block $B'p_1$. Such an operation is performed by a reconstruction software module MR_DO1 represented in FIG. 8.

In the course of a step D11 represented in FIG. 7, the decoding module MD_DO1 tests whether the decoded current block is the last block identified in the signal F'.

If the current block is the last block of the signal F', in the course of a step D12 represented in FIG. 7, the decoding method is terminated.

If such is not the case, there is undertaken the selection of the following block $B'_1$ to be decoded in accordance with the aforementioned raster scan order of traversal, by iteration of steps D1 to D10, for $1 \leq i \leq Z$.

Another embodiment of the invention will now be described, mainly with reference to FIG. 7.

This other embodiment is distinguished from the previous one solely by the number of hidden coefficients which is either 0, or N, N being an integer such that $N \geq 2$.

For this purpose, the aforementioned comparison sub-step D32 is replaced with sub-step D32a represented dashed in FIG. 7, in the course of which there is undertaken the comparison of the number of coefficients liable to have been modified with several predetermined thresholds $0<TSIG\_1<TSIG\_2<TSIG\_3 \ldots$, in such a way that if the number of said coefficients lies between TSIG_N and TSIG_N+1, N signs have been hidden.

If the number of said coefficients is less than the first threshold TSIG_1, there is undertaken, in the course of the aforementioned step D4, the conventional entropy decoding of all the signs of the coefficients of the list $E_1$. For this purpose, the sign of each non-zero coefficient of the list $E_1$ is decoded entropically.

If the number of said coefficients lies between the threshold TSIG_N and TSIG_N+1, there is undertaken, in the course of the aforementioned step D4, the conventional entropy decoding of all the signs of the coefficients of the list $E_1$, with the exception of the N respective signs of the first N non-zero coefficients of said modified list $Em_1$, said N signs being hidden.

In this other embodiment, the processing module MTR_DO1 calculates, in the course of step D5, the value of the function f which is the remainder modulo $2^N$ of the sum of the coefficients of the sub-list $SEm_1$. It is assumed that in the example proposed, N=2.

The processing module MTR_DO1 then deduces therefrom the configuration of the two hidden signs which are allotted respectively to each of the first two non-zero coefficients $\varepsilon 2$ and $\varepsilon 3$, according to the convention used on coding.

Once these two signs have been reconstructed, steps D6 to D12 described hereinabove are carried out.

It goes without saying that the embodiments which have been described hereinabove have been given purely by way of indication and are not at all limiting, and that numerous modifications can easily be made by the person skilled in the art without however departing from the scope of the invention.

Thus for example, according to a simplified embodiment with respect to that represented in FIG. 4, the coder CO1 could be configured to hide at least N' predetermined signs, with N'≥1, instead of either zero, or one or N predetermined signs. In this case, the comparison step C72 or C72a would be dispensed with. In a corresponding manner, according to a simplified embodiment with respect to that represented in FIG. 8, the decoder DO1 would be configured to reconstruct N' predetermined signs instead of either zero, or one or N predetermined signs. In this case, the comparison step D32 or D32a would be dispensed with. Furthermore, the decision criterion applied in the coding step C72 and in the decoding step D32 could be replaced with another type of criterion. For this purpose, instead of comparing with a threshold the number of modifiable coefficients or the number of coefficients liable to have been modified, the processing module MTR_CO1 or MTR_DO1 could apply a decision criterion which is respectively dependent on the sum of the amplitudes of the coefficients that are modifiable or liable to have been modified, or else the number of zeros present among the coefficients that are modifiable or liable to have been modified.

What is claimed is:

1. A non-transitory computer-readable medium storing image data representative of a sign-data-hiding enabled block of an image for decoding by a decoder,
  wherein the image data comprises a set of coefficients representing a residual block for the sign-data-hiding enabled block,
  wherein the set of coefficients includes a particular non-zero coefficient that is without a sign designation,
  wherein a parity of a sum of absolute values of modifiable coefficients in the set of coefficients indicates a sign for the particular non-zero coefficient that is without a sign designation,
  wherein a modifiable coefficient is a coefficient between a first non-zero coefficient according to a reverse scan order of the residual block and a last non-zero coefficient according to the reverse scan order, inclusive of the first and the last non-zero coefficients,
  wherein the count of modifiable coefficients in the set of coefficients is greater than 4, and
  wherein, during decoding of the image data by the decoder, the sign designation of the particular non-zero coefficient is derived by:
    determining that sign data hiding is enabled for the sign-data-hiding enabled block based on determining that the count of modifiable coefficients in the set of coefficients is greater than 4, and
    in response to determining that sign data hiding is enabled, determining the sign for the particular non-zero coefficient from the parity of the sum of the absolute values of the modifiable coefficients in the set of coefficients.

* * * * *